(12) United States Patent
Patel et al.

(10) Patent No.: US 7,739,483 B2
(45) Date of Patent: Jun. 15, 2010

(54) METHOD AND APPARATUS FOR INCREASING LOAD BANDWIDTH

(75) Inventors: Rajesh Patel, Austin, TX (US); James Dundas, Austin, TX (US); Adi Yoaz, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1334 days.

(21) Appl. No.: 09/968,474

(22) Filed: Sep. 28, 2001

(65) Prior Publication Data

US 2003/0065908 A1    Apr. 3, 2003

(51) Int. Cl.
G06F 7/38 (2006.01)
G06F 9/00 (2006.01)
G06F 9/44 (2006.01)

(52) U.S. Cl. .................. 712/214; 712/215; 712/225; 711/213

(58) Field of Classification Search .......... 712/214, 712/215, 225; 711/213, 214
See application file for complete search history.

(56) References Cited

U.S. PATENT DOCUMENTS

| | | | | |
|---|---|---|---|---|
| 5,210,838 A | * | 5/1993 | Jensen | 711/213 |
| 5,822,788 A | * | 10/1998 | Kahn et al. | 711/213 |
| 6,055,629 A | * | 4/2000 | Kulkarni et al. | 712/239 |
| 6,141,747 A | * | 10/2000 | Witt | 712/225 |

* cited by examiner

*Primary Examiner*—Alford W Kindred
*Assistant Examiner*—Jesse R Moll
(74) *Attorney, Agent, or Firm*—Caven & Aghevli LLC

(57) ABSTRACT

A method and apparatus for dual-target register allocation is described, intended to enable the efficient mapping/renaming of registers associated with instructions within a pipelined microprocessor architecture.

33 Claims, 3 Drawing Sheets

METHOD AND APPARATUS FOR INCREASING LOAD BANDWIDTH

FIELD OF THE INVENTION

The invention described herein relates to the field of microprocessor architecture. More particularly, the invention relates to the scheduling of multiple load operations within a load cycle of a pipelined microprocessor.

BACKGROUND

Microprocessor performance may be increased by enabling multiple cache load operations to be executed within the same cycle. One method of increasing the load bandwidth of a microprocessor is to support additional cache ports that may be accessed in parallel. However, supporting additional cache ports within cache memories, such as a Level 1 (L1) cache can be expensive in terms of die area and cycle time.

Other techniques to increase load bandwidth include interleaving, replication, time-division multiplexing, and line buffering. Interleaving involves dividing a cache into a number of sub-banks and using low-order address bits to access the banks. However, interleaving requires more die area for crossbar switching to direct loads and retired stores to the proper cache bank.

Replication involves emulating an N-port cache by replicating an M-port data cache array N/M times. While replication eliminates the bank conflict problem of interleaving, it may be expensive in terms of die area. Furthermore, while replication addresses the load-bandwidth problem, it exacerbates the store-bandwidth problem since store traffic must be broadcast to all of the replicated arrays simultaneously in order to ensure that each array has an updated copy of the data.

Time-division multiplexing involves emulating an N-port data cache by decreasing the cycle time of an M-port array by a factor of N/M. However, time-division multiplexing is difficult and expensive to implement and scale to higher frequencies.

Line buffering involves adding a small line-buffer that holds cache lines recently read from the cache by load operations. Subsequent loads may obtain data from this buffer, which can be multi-ported due to its small size. However, line buffering is complex and expensive in terms of cycle times, because loads that miss in the buffer must go to the cache, thereby increasing latency.

BRIEF DESCRIPTION OF THE DRAWINGS

The features and advantages will become apparent from the following detailed description in which.

DETAILED DESCRIPTION

A method and apparatus for increasing load bandwidth is described, intended to enable increased load operation performance without substantially increasing die area or power within a pipelined microprocessor architecture.

The present invention is described by way of embodiments, which exemplify the features of the present invention. The invention may be implemented in hardware or software or a combination thereof. In particular, hardware circuits described herein may be implemented using standard complementary metal-oxide semiconductor (CMOS) technology, or other technologies not specifically described. Integrated circuits described herein, such as a microprocessor, cache, or other device, may be implemented as monolithic integrated circuits or on separate die.

Figure 1:
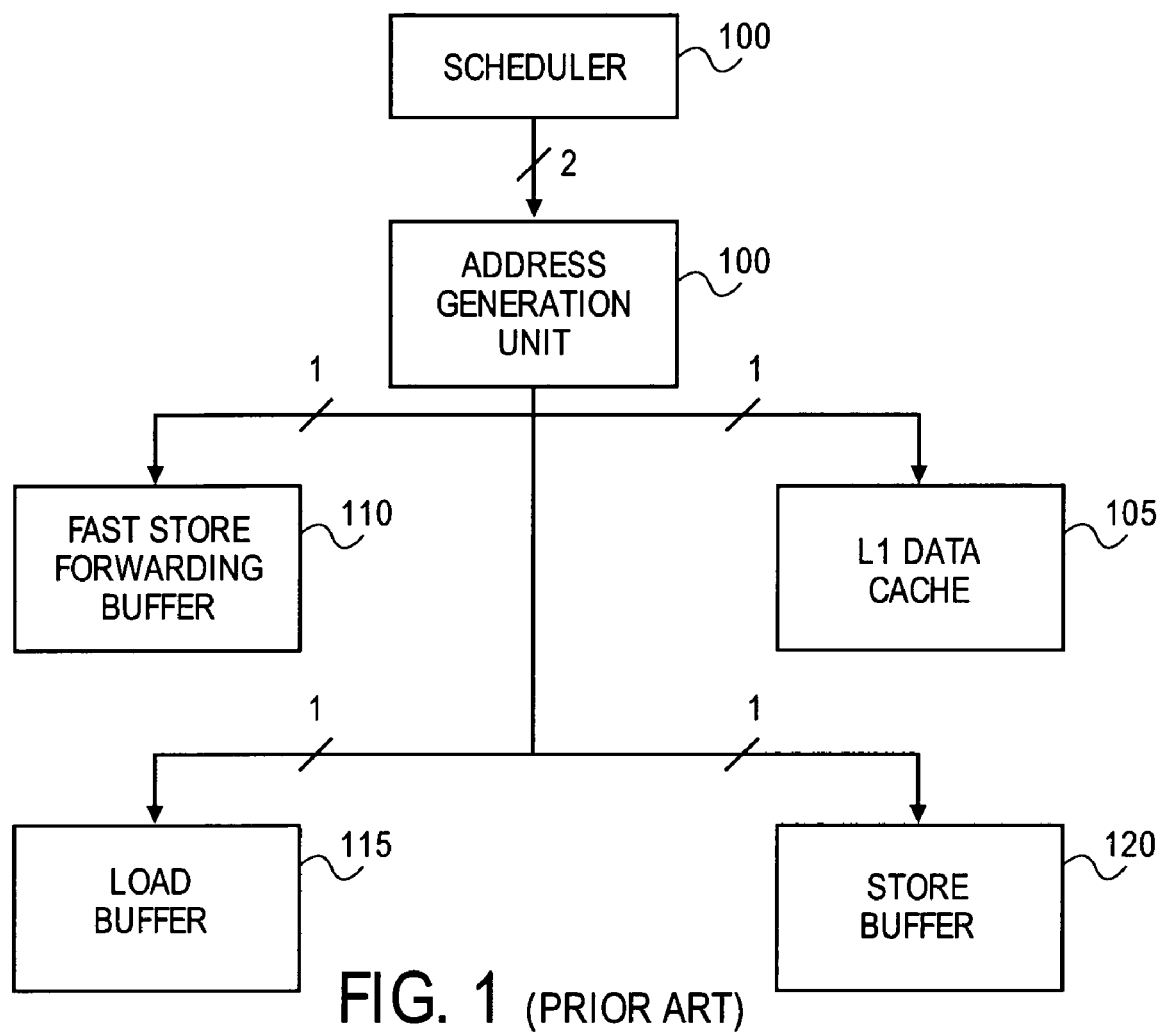
FIG. 1 illustrates a prior art architecture for supporting one load per cycle.

FIG. 1 illustrates a microprocessor than can support execution of only one load per cycle. A scheduler 100 may be a circuit that schedules load and store operations to be issued to an level 1 (L1) data cache 105 and a fast store forwarding buffer 110, respectively. The L1 data cache is a semiconductor memory device that may be used to store previously loaded data and can be accessed by load operations quickly without resorting to system memory. Similarly, the fast store-forwarding buffer is a semiconductor memory device that may store data that is intended to be stored to system memory and can be accessed by load operations quickly without resorting to system memory.

Load and store operations may be stored within a load buffer 115 and store buffer 120, respectively, before accessing system memory. A load operation may retrieve load data faster than accessing the data from the load buffer by attempting to retrieve the load data from the L1 data cache. However, more current versions of load data may exist within the fast store-forwarding buffer that will be updated in system memory or the L1 data cache. Therefore, load operations may be satisfied faster by attempting to retrieve the load data from the fast store-forwarding buffer, rather than wait for the most current version of the load data to be updated within the L1 data cache or system memory.

The fast store forwarding buffer, the L1 data cache, the load buffer, and the store buffer may be implemented using circuitry well known to those of ordinary skill in the art, including Static Random Access Memory (SRAM) cells using standard complementary metal-oxide-semiconductor (CMOS) technologies. However, other memory circuit architectures and/or semiconductor technologies may be used. Similarly, the schedule may be implemented as a semiconductor logic circuit using standard CMOS devices. Alternatively, some or all of the scheduler may implemented on a machine-readable medium in which instructions are stored, which when executed by a processor perform operations to schedule load operations within a microprocessor.

In order to access the fast store-forwarding buffer and the L1 data cache, an address generation unit 125 generates a partial address in order to facilitate fast access to the L1 data cache. In order to access the load buffer or store buffer, a full address is generated by the address generation unit, which may take more time to generate and decode than the partial address generated to access the L1 data cache. Furthermore, L1 data cache typically supports faster access speeds than other memory structures within a computer system. Therefore, a time savings can be realized by attempting to retrieve load data from the L1 data cache instead of other memory structures, such as the store or load buffers or system memory.

However, failed attempts to retrieve load data from either the fast store forwarding buffer or L1 data cache may need to be rescheduled and re-issued in order to satisfy a load operation. Similarly, any operations that depend on the failed load operation must also be rescheduled, as the data upon which they depend has not been successfully retrieved.

The L1 data cache may support a limited number of cache ports as cache ports may be costly in terms of die area, cycle time, and power consumption. Store forwarding buffer ports, on the other hand, typically do not require as much die area as L1 data cache ports. Therefore, multiple store forwarding buffer ports may be implemented without incurring as much die cost as when implementing multiple L1 cache ports. The architecture illustrated in FIG. 1, therefore, is limited to supporting only one load operation per access cycle.

Alternatively, two loads per cycle may be supported by the microprocessor architecture of FIG. 1 by using two ports in the fast store forwarding buffer and the L1 data cache. However, implementing multiple data cache ports may result in lower clock rate, higher complexity/cost, and higher power consumption.

Figure 2:
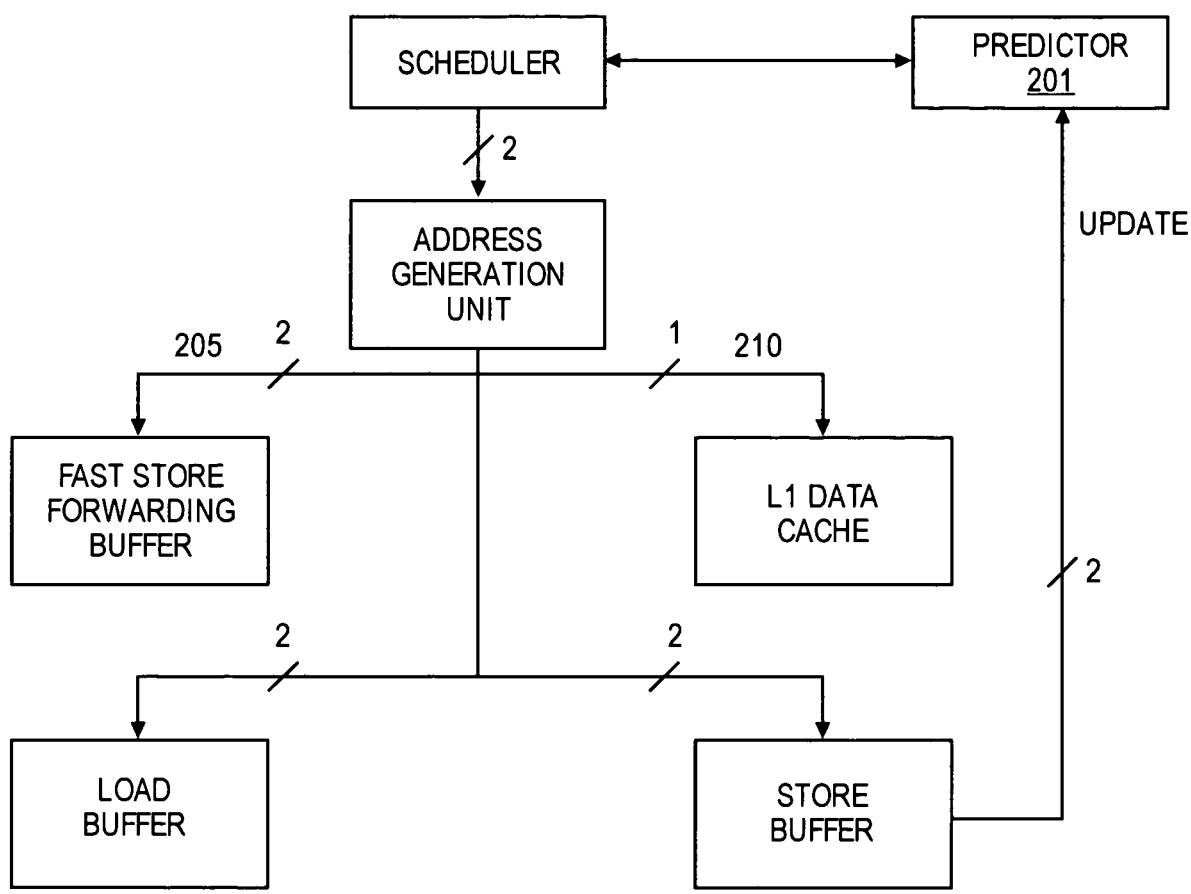
FIG. 2 illustrates an architecture that supports multiple loads per cycle according to one embodiment of the present invention.

FIG. 2 illustrates a microprocessor in which multiple loads may be issued during the same access cycle, according to one embodiment, without incurring die cost and cycle time associated with implementing multiple L1 data cache ports.

In one embodiment, a prediction is made as to whether a load will be satisfied by accessing the store-forwarding buffer or the L1 data cache. The loads are then scheduled and issued accordingly. If a load operation is predicted to be satisfied by accessing the store-forwarding buffer, the accuracy of the prediction may be verified by checking to see whether a store corresponding to the target address of the predicted load operation is later stored within the store buffer. If the prediction was correct, a predictor 201 may be updated in order to better predict the likelihood that the same load operation will be satisfied by accessing the store-forwarding buffer in the future. Likewise, if the prediction was incorrect, the predictor may be updated accordingly.

Multiple ports may be implemented relatively inexpensively with regard to cycle time, power consumption, and die area in the store-forwarding buffer. In one embodiment, two store-forwarding buffer ports 205 are implemented whereas only one L1 data cache port 210 is implemented such that multiple load operations may be scheduled and issued without incurring excessive die area, power consumption, and cycle time cost.

While one embodiment of the present invention has been described in which two store-forwarding buffer ports are implemented, more than two store-forwarding buffer ports may be implemented in other embodiments. Likewise, although one L1 data cache port has been implemented in one embodiment of the present invention, more than one L1 data cache port may be implemented, depending upon the cost and power consumption requirements of the computer system in which the present invention is used.

Various prediction algorithms may be implemented in order to predict whether a load operation will be satisfied by accessing the store forwarding buffer or the L1 data cache. In one embodiment, an N-bit saturating bimodal counter may be implemented as a prediction algorithm. An N-bit saturated bimodal counter may be realized by a two-bit counter which increments or decrements between four states, each corresponding to a different strength of a prediction for a given load operation.

For example, if it is determined that a load was predicted correctly, the predictor may increment the two-bit counter to indicate that the load operation is now a "strongly predicted" load. Alternatively, if it is determined that the load operation was incorrectly predicted to be satisfied by accessing the store-forwarding buffer, the counter may be decremented to indicate that the load is a "weakly predicted" load.

Other prediction algorithms may be used, including a static prediction bit in the compiler or a "wait table" predictor, such as that used in the ALPHA 21264 microprocessor.

Regardless of the particular prediction algorithm used, the predictor may be implemented either as a semiconductor logic circuit using standard CMOS semiconductor devices, or other semiconductor technology. Alternatively, some or all of the predictor may implemented on a machine-readable medium in which instructions are stored, which when executed by a processor perform operations to predict whether load operations within a microprocessor will be satisfied by accessing a fast store-forwarding buffer.

Figure 3:
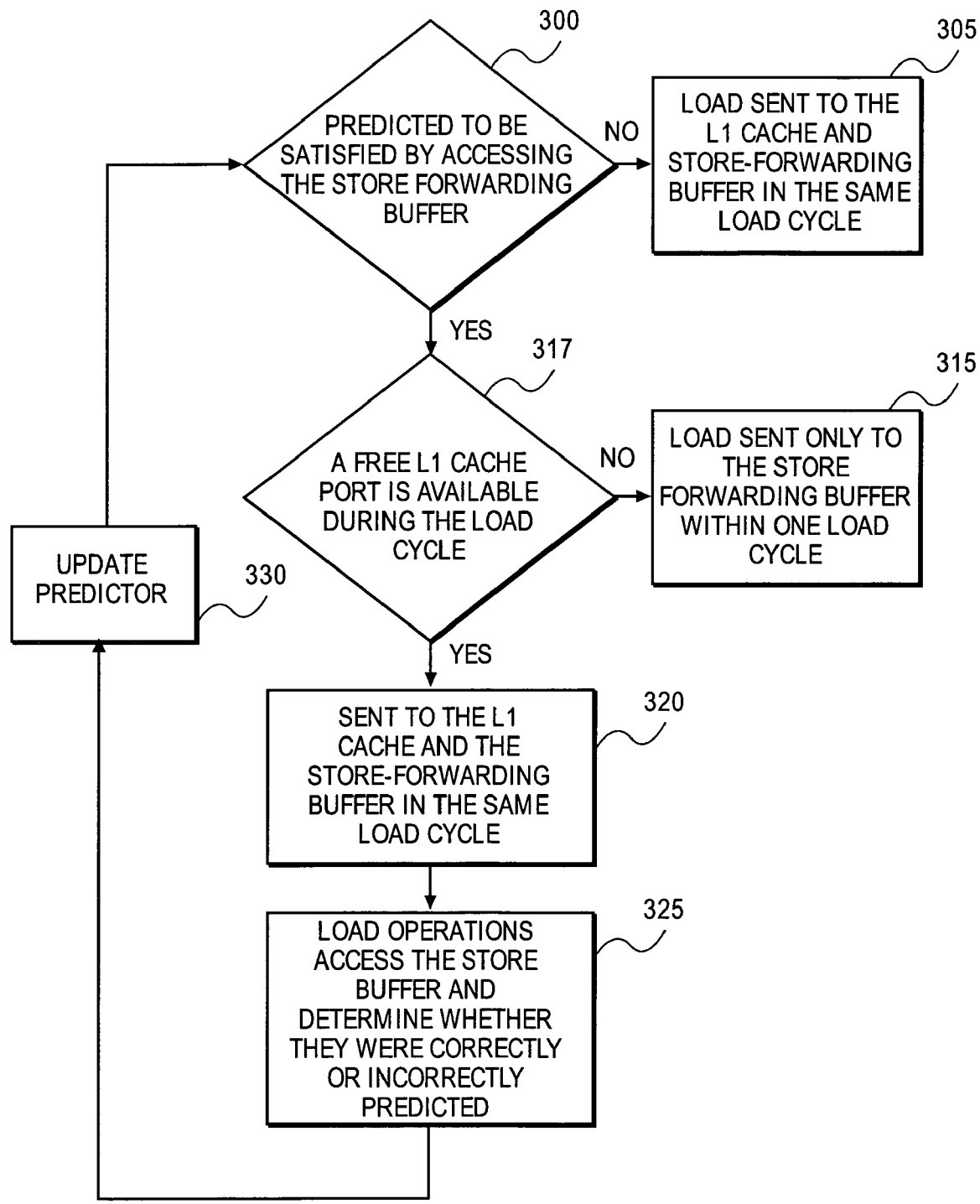
FIG. 3 illustrates a method for supporting multiple loads per cycle according to one embodiment of the present invention.

FIG. 3 illustrates a method for supporting multiple loads per cycle according to one embodiment. In one embodiment, loads that are not predicted to be satisfied by accessing the store forwarding buffer at operation 301 may be sent to the L1 data cache and store-forwarding buffer in the same load cycle at operation 305, while those that are predicted to be satisfied by accessing the store forwarding buffer may be sent only to the store forwarding buffer within one load cycle at operation 315. Alternatively, loads that are predicted to be satisfied by accessing the store forwarding buffer may be sent to the L1 cache and the store-forwarding buffer in the same load cycle at operation 320 if a free L1 cache port is available during the load cycle at operation 317. By issuing the same load operation to both the L1 cache and the store-forwarding buffer in the same load cycle, the load operation may be satisfied without incurring replay if the load was incorrectly predicted. Predictor updates may occur at operation 330 after the load operations access the store buffer and determine whether they were correctly or incorrectly predicted at operation 325.

In one embodiment, the store forwarding buffer and address generation unit are dual ported to allow all loads to check the store forwarding buffer, including loads that are not predicted to be satisfied by accessing the store forwarding buffer. Loads not predicted to be satisfied by accessing the store-forwarding buffer may, therefore, access load data without incurring replay.

Embodiments of the present invention, either in whole or in part, may be implemented using in hardware or by a machine-readable medium containing instructions, which when executed by a processor, perform operations corresponding to the present invention. Accordingly, some aspects of the invention may be implemented in hardware while others are implemented in software.

While this invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A method comprising:
predicting whether a load operation will be satisfied by accessing a store-forwarding buffer;
scheduling a plurality of load operations to be performed within a load cycle, said plurality of load operations comprising a load operation predicted to be satisfied by accessing said store-forwarding buffer;
issuing said load operation predicted to be satisfied by accessing said store-forwarding buffer to the store-forwarding buffer and not a data load cache.

2. The method of claim 1 further comprising issuing a load operation not predicted to be satisfied by accessing said store-forwarding buffer to the data load cache within said load cycle.

3. The method of claim 2 further comprising issuing said load operation not predicted to be satisfied by accessing said store-forwarding buffer to said store-forwarding buffer within said load cycle.

4. The method of claim 1 further comprising issuing said load operation to said data load cache if the load operation is not predicted to be satisfied by accessing the store-forwarding buffer.

5. The method of claim 2 wherein said load operation predicted to be satisfied by accessing said store-forwarding buffer or said load operation not predicted to be satisfied by accessing said store-forwarding buffer is rescheduled if said predicting is incorrect.

6. The method of claim 5 wherein said rescheduling comprises rescheduling a dependent load operation, said dependent load operation being dependent upon said load operation predicted to be satisfied by accessing said store-forwarding buffer or upon said load operation not predicted to be satisfied by accessing said store-forwarding buffer.

7. The method of claim 3 wherein said load operation not predicted to be satisfied by accessing said store-forwarding buffer is issued to said store-forwarding buffer within said load cycle in order to prevent replay if said prediction is incorrect.

8. The method of claim 4 wherein said load operation predicted to be satisfied by accessing said store-forwarding buffer is issued to said data load cache within said load cycle in order to prevent replay if said prediction is incorrect.

9. The method of claim 1 wherein said predicting is a function of how often said load operation is satisfied by accessing a store-forwarding buffer.

10. An apparatus comprising:
a prediction unit to predict whether a load operation will be satisfied by accessing a store-forwarding buffer;
a data load cache unit, said data load cache unit being coupled to a scheduler unit, wherein said load operation predicted to be satisfied by accessing said store-forwarding buffer is to be issued to said store-forwarding buffer and not the data load cache unit if no other load operation has been issued to said data load cache unit within a load cycle.

11. The apparatus of claim 10 wherein the scheduler unit is to schedule a plurality of load operations within a load cycle, wherein said scheduler unit is enabled to schedule a load operation not predicted to be satisfied by accessing said store-forwarding buffer within said load cycle.

12. The apparatus of claim 11 wherein said load operation not predicted to be satisfied by accessing said store-forwarding buffer is issued to a data cache unit.

13. The apparatus of claim 12 wherein said load operation not predicted to be satisfied by accessing said store-forwarding buffer is issued to said store-forwarding buffer within said load cycle.

14. The apparatus of claim 13, wherein said plurality of load operations comprises a load operation predicted by said prediction unit to be satisfied by accessing said store-forwarding buffer.

15. The apparatus of claim 13 wherein said load operation predicted to be satisfied by accessing said store-forwarding buffer or said load operation not predicted to be satisfied by accessing said store-forwarding buffer is rescheduled if said prediction is incorrect.

16. The apparatus of claim 15 wherein said rescheduling comprises rescheduling a dependent load operation, said dependent load operation being dependent upon said load operation predicted to be satisfied by accessing said store-forwarding buffer or upon said load operation not predicted to be satisfied by accessing said store-forwarding buffer.

17. The apparatus of claim 10 further comprising a store buffer, said prediction unit being coupled to said store buffer.

18. The apparatus of claim 17 wherein said predicting is a function of how often load operation is satisfied by accessing a store-forwarding buffer.

19. The apparatus of claim 18 wherein said function is dependent upon whether said load operation predicted to be satisfied by accessing said store-forwarding buffer is present within said store buffer.

20. A system comprising:
a prediction unit to predict whether a load operation will be satisfied by accessing a store-forwarding buffer;
a scheduler unit to schedule a plurality of load operations within a load cycle, said plurality of load operations comprising a load operation predicted by said prediction unit to be satisfied by accessing said store-forwarding buffer;
a data load cache unit, said data load cache unit being coupled to said scheduler unit, wherein the load operation is issued to said data load cache unit and not the store-forwarding buffer if the load operations is not predicted to be satisfied by accessing said store-forwarding buffer.

21. The system of claim 20 wherein said scheduler unit is enabled to schedule a load operation not predicted to be satisfied by accessing said store-forwarding buffer within said load cycle.

22. The system of claim 21 wherein said load operation not predicted to be satisfied by accessing said store-forwarding buffer is issued to said data load cache unit.

23. The system of claim 22 wherein said load operation not predicted to be satisfied by accessing said store-forwarding buffer is issued to said store-forwarding buffer within said load cycle.

24. The system of claim 23 wherein said load operation predicted to be satisfied by accessing said store-forwarding buffer or said load operation not predicted to be satisfied by accessing said store-forwarding buffer is rescheduled if said prediction is incorrect.

25. The system of claim 24 wherein said rescheduling comprises rescheduling a dependent load operation, said dependent load operation being dependent upon said load operation predicted to be satisfied by accessing said store-forwarding buffer or upon said load operation not predicted to be satisfied by accessing said store-forwarding buffer.

26. The system of claim 20 further comprising a store buffer, said prediction unit being coupled to said store buffer.

27. The system of claim 26 wherein said prediction is a function of how often load operation is satisfied by accessing a store-forwarding buffer.

28. The system of claim 27 wherein said predicting is dependent upon whether said load operation predicted to be satisfied by accessing said store-forwarding buffer is present within said store buffer.

29. A method comprising:
scheduling a plurality of load operations to be issued within a first load cycle of a microprocessor;
issuing a plurality of loads in said first load cycle, said plurality of loads comprising at least one load operation capable of being issued to a first level (L1) data cache and a fast store-forwarding buffer (FSFB) within a same load cycle; and
issuing the at least one load operation to the FSFB and not a data load cache.

30. The method of claim 29 further comprising predicting whether either of said at least two loads will be satisfied by accessing said FSFB.

31. The method of claim 30 further comprising determining whether said predicting was correct.

32. The method of claim 31 wherein said determining comprises accessing a store buffer in order to verify that a store operation is stored within said store buffer comprising a target address corresponding to either of said at least two loads predicted to be satisfied by accessing said FSFB.

33. The method of claim 32 further comprising rescheduling either of said at least two loads predicted to be satisfied by said FSFB if said predicting is incorrect.

* * * * *